J. R. SAWYERS.
WINDMILL.
APPLICATION FILED SEPT. 17, 1910.
992,067.
Patented May 9, 1911.
3 SHEETS—SHEET 1.
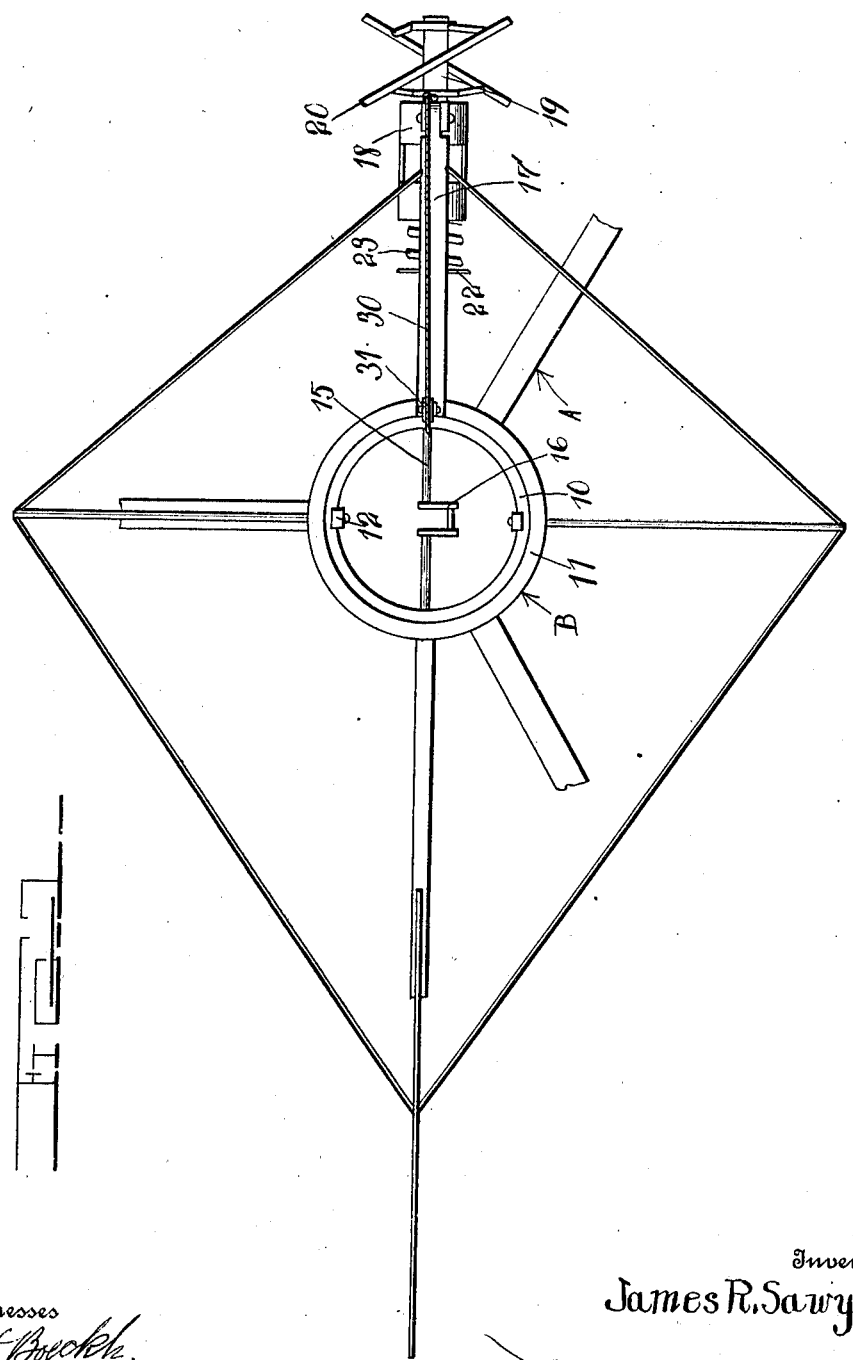
Witnesses
Inventor
James R. Sawyers

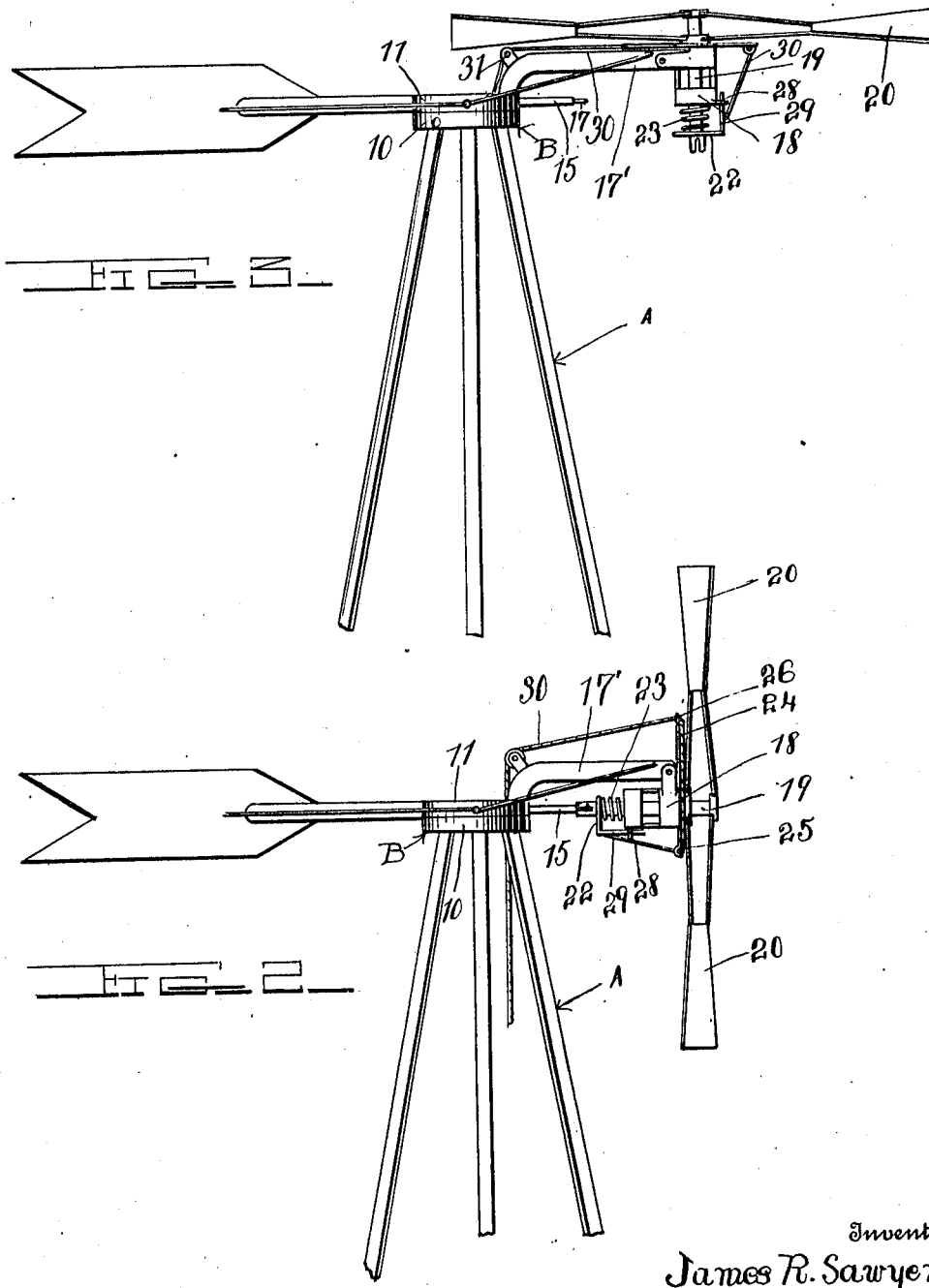

J. R. SAWYERS.
WINDMILL.
APPLICATION FILED SEPT. 17, 1910.
992,067.
Patented May 9, 1911.
3 SHEETS—SHEET 3.
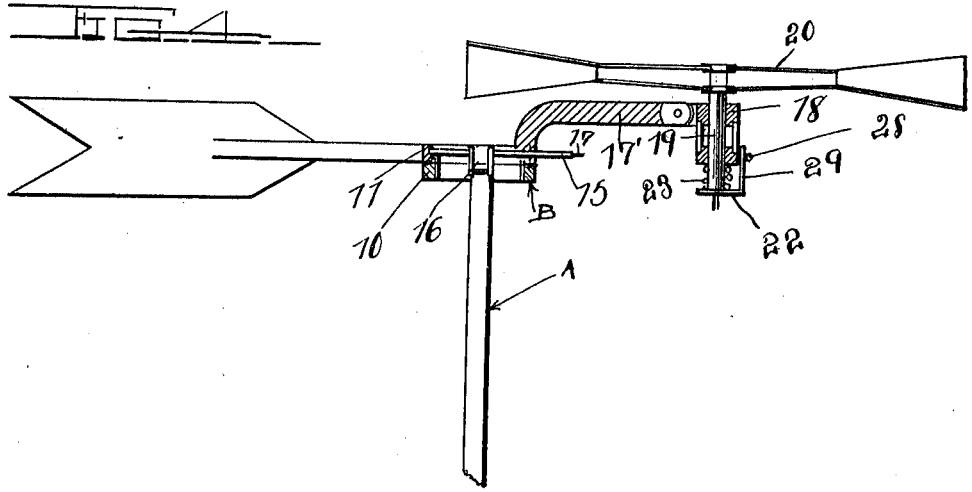
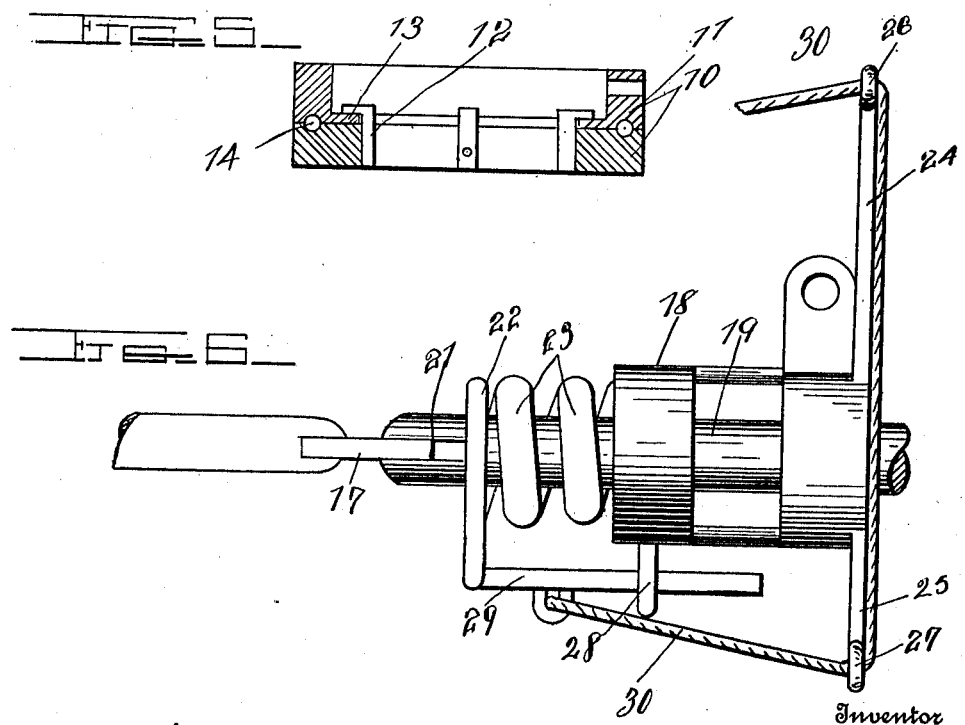
Witnesses
Inventor
James R. Sawyers
By
Attorney

UNITED STATES PATENT OFFICE.

JAMES R. SAWYERS, OF DEXTER, IOWA.

WINDMILL.

992,067. Specification of Letters Patent. Patented May 9, 1911.

Application filed September 17, 1910. Serial No. 582,503.

*To all whom it may concern:*

Be it known that I, JAMES R. SAWYERS, a citizen of the United States, residing at Dexter, in the county of Dallas, State of Iowa, have invented certain new and useful Improvements in Windmills; and I do hereby declare the following to be a full, clear, and exact description of the invention, such as will enable others skilled in the art to which it appertains to make and use the same.

This invention relates to wind mills.

The object of the invention resides in an improved construction in a device of this character for shifting the wind wheel thereof away from the wind by moving said wheel from its normal vertical position to a substantially horizontal position; said movement of the wind wheel serving at the same time to disconnect same from the drive shaft journaled in the turn table of the mill.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views: and in which—

Figure 1 is a plan view of a wind mill constructed in accordance with the invention; Fig. 2, a side elevation of the upper end of a wind mill constructed in accordance with the invention; the wind wheel thereof being shown in vertical or normal position; Fig. 3, a view similar to Fig. 2 with the wind wheel thereof disposed in horizontal position and disconnected from the shaft carried by the turn table of the mill; Fig. 4, a vertical longitudinal section of what is shown in Fig. 3; Fig. 5, a vertical longitudinal section of the turn table of the mill on an enlarged scale; and Fig. 6, an enlarged detail view of the detachable connection between the wind wheel and the shaft carried by the turn table.

Referring to the drawings A indicates the tower of the mill which carries at its top a turn table B. This turn table is formed of a fixed section 10 and a movable section 11, the latter being secured against vertical and lateral movement with the respect to the section 10 by means of keepers 12 which are secured to the section 10 and have their upper ends overlying a flange 13 on the inner face of the section 11. Balls 14 are disposed between the sections 10 and 11 to form a frictionless bearing for the rotating member of the turn table. Journaled in the rotatable member 11 of the turn table is a shaft 15 which is provided intermediately with a crank 16 to which is adapted to be secured the upper end of the usual pump rod. One end of the shaft 15 is extended through the member 11 and is provided with a tongue 17 which constitutes one member of the clutch connection for a purpose that will presently appear. Fixed to the member 11 and extending laterally therefrom in the same direction as the extended end of the shaft 15 is an arm 17'. Pivoted to the free end of the arm 17 is a bearing 18; said bearing being adapted for movement on its pivot from a substantially horizontal position as shown in Fig. 2 to a substantially vertical position as shown in Fig. 4. Journaled in this bearing and movable longitudinally thereof is a shaft 19 one end of which carries the usual wind wheel 20, while the other end is provided with a recess 21 adapted to receive the tongue 17 on the extended end of the shaft 15 so as to operatively connect said shaft 15 with the wind wheel 20.

When the bearing 18 is disposed in a horizontal position as shown in Fig. 2 the shaft 19 is automatically moved toward the shaft 15 through the instrumentality of the following structure. A flange 22 is formed on the shaft 19 at the inner end of the recess 21 and a spring 23 encircles said shaft with one end bearing against the flange 22 and the other end bearing against the bearing 18. The tension of this spring 23 will, as is apparent, move the shaft 19 so that the tongue 17 of the shaft 15 will be disposed in the recess 21 whereby the rotation of the wind wheel 20 will produce a coresponding rotation of the shaft 15 and operate the wind mill. The bearing 18 is provided against the wind wheel 20 with oppositely extending arms 24 and 25 provided at their free ends with eyes 26 and 27 respectively. Mounted on the lower side of the bearing 18 adjacent to spring 23 is an eye bolt 28 in which is adapted to travel an extension 29 of the flange 22. A flexible connection 30 has one end secured to the extension 29 and is carried through the eyes 27 and 26 and over a pulley 31 mounted on the arm 17 to a point at the base of the wind mill tower so as to be within convenient reach of an operator. This connection 30 is utilized when it is desired to move the wind wheel 20 from the position shown in Fig. 2 to the positions shown in Figs. 3 and 4. When a pull is exerted on the connection 30 by the operator it will first serve to move the shaft 19 longitudinally against the influence of the spring 23. This movement of the shaft 19 will disconnect the latter from the shaft 15 and when this disconnection takes place the pull on the connection 30 will cause the bearing 18 to swing on its pivot from a horizontal to a vertical position and will in turn cause the wind wheel 20 to move from a vertical to a horizontal position.

From the foregoing description it will be apparent that the device is of an extremely simple and inexpensive construction and especially adapted for the purposes for which it is intended, since it is strong and durable and not liable to become deranged or broken while in use.

What is claimed is:—

1. In a wind mill, the combination of a turn table, a shaft journaled in said turntable provided with a clutch connection at one end, an arm fixed on said turntable and projecting laterally therefrom, a bearing pivoted to the fixed end of said arm for movement in a vertical plane, a shaft journaled in said bearing and movable longitudinally thereof, said shaft having a clutch connection on one end and adapted to be disposed in alinement with the shaft journaled in the turn table in one position of the bearing, a wind wheel mounted on the other end of the shaft journaled in the pivoted bearing, a flange on said shaft adjacent the clutch connection, a spring surrounding the shaft having one end in engagement with the flange and the other end in engagement with the pivoted bearing for shifting said shaft longitudinally to move the clutch connection thereof into operative engagement with the clutch connection on the shaft journaled in the turn table, and means for moving said shaft longitudinally against the influence of said spring to disengage said clutch connections.

2. In a wind mill, the combination of a turn table, a shaft journaled in said turntable provided with a clutch connection at one end, an arm fixed on said turn table and projecting laterally therefrom, a bearing pivoted to the free end of said arm for movement in a vertical plane, a shaft journaled in said bearing and movable longitudinally thereof, said shaft having a clutch connection on one end and being adapted to be disposed in alinement with the shaft journaled in the turntable in one position of the bearing, a wind wheel mounted on the other end of the shaft journaled in the pivoted bearing, a flange on the shaft adjacent the clutch connection, a spring surrounding the shaft having one end in engagement with the flange and the other end in engagement with the pivoted bearing for shifting said shaft longitudinally to move the clutch connection thereof into operative engagement with the clutch connection on the shaft journaled in the turntable, an eye fixed to said bearing, an extension on said flange extending through the eye, oppositely disposed extensions on said bearing having loops at each end and a flexible connection having one end secured to the extension on flange and passing through the eyes in the oppositely disposed extensions on the bearing.

In testimony whereof, I affix my signature, in presence of two witnesses.

JAMES R. SAWYERS.

Witnesses:
 LEE B. TICHICK,
 G. N. SKINNER.

---

Copies of this patent may be obtained for five cents each, by addressing the "Commissioner of Patents, Washington, D. C."